United States Patent [19]
Okamura

[11] Patent Number: 5,808,825
[45] Date of Patent: Sep. 15, 1998

[54] READ ERROR RECOVERY METHOD AND APPARATUS FOR USE IN DISK STORAGE SYSTEM

[75] Inventor: Hiroshi Okamura, Tokyo, Japan

[73] Assignee: Kabushiki Kaisha Toshiba, Kawasaki, Japan

[21] Appl. No.: 691,113

[22] Filed: Aug. 1, 1996

[30] Foreign Application Priority Data

Mar. 15, 1996 [JP] Japan .................................. 8-059748

[51] Int. Cl.$^6$ ............................................ G11B 5/41
[52] U.S. Cl. ............................................. 360/75; 360/69
[58] Field of Search ................. 360/75, 69, 71, 360/73.03, 74.1, 128

[56] References Cited

U.S. PATENT DOCUMENTS

| | | | |
|---|---|---|---|
| 5,233,482 | 8/1993 | Galbraith et al. | 360/46 |
| 5,424,884 | 6/1995 | Nonaka | 360/73.03 X |
| 5,461,521 | 10/1995 | Ito et al. | 360/75 |
| 5,696,643 | 12/1997 | Tsuwako et al. | 360/75 X |

FOREIGN PATENT DOCUMENTS 58-118063  7/1983  Japan .
61-170958  8/1986  Japan ............................. 360/75 L

OTHER PUBLICATIONS

"Magnetic Recording Channel Front–End" IEEE Trans. Mag vol. 27, No. 6, Nov. 1991, K. B. Klaassen, pp. 4503–4508.

*Primary Examiner*—Aristotelis M. Psitos
*Assistant Examiner*—James L. Habermehl
*Attorney, Agent, or Firm*—Limbach & Limbach L.L.P.

[57] ABSTRACT

The invention provides a method for effectively removing the cause of a thermal asperity (TA) phenomenon occurring at an MR head incorporated in a disk storage system. If a read error occurs in data read by the MR head, a CPU executes a usual read retry operation. If the read error is not removed by the usual read retry operation, the CPU presumes that the read error is caused by the thermal asperity phenomenon occurring at the MR head. Then, the CPU controls the MR head to move to a CSS zone on the disk, thereby executing a TA removal operation so as to remove a fine particle such as dust attached to the MR head. In the TA removal operation, the rotational speed of the disk is reduced so that the MR head can be brought into contact with the disk in the CSS zone.

1 Claim, 9 Drawing Sheets

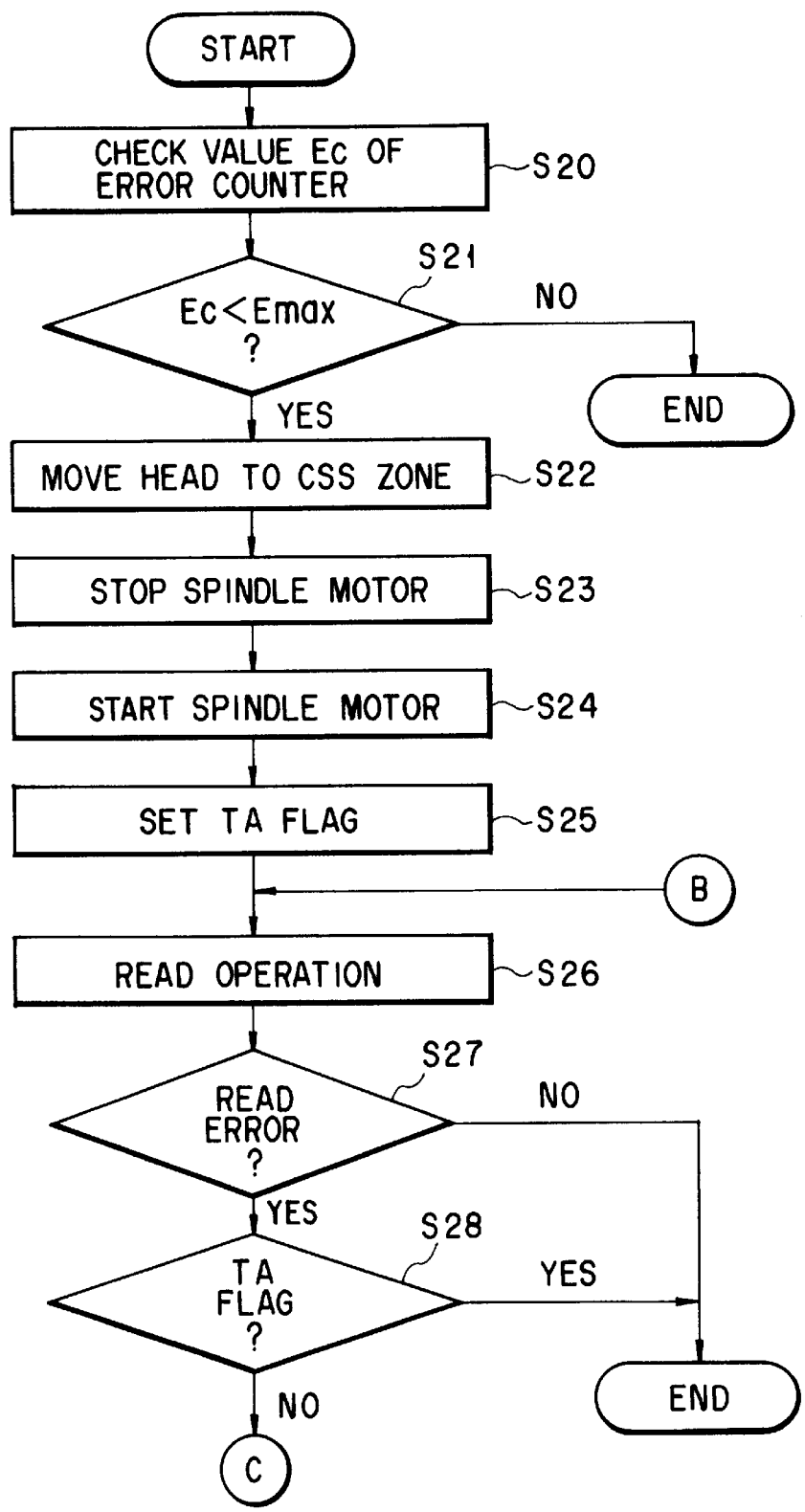
F I G. 3

| HEAD NUMBER | SECTOR ADDRESS | TA COUNT |
|---|---|---|
| 0 | X | Na |
|  | Y | Nb |
| 1 | ⋮ | ⋮ |

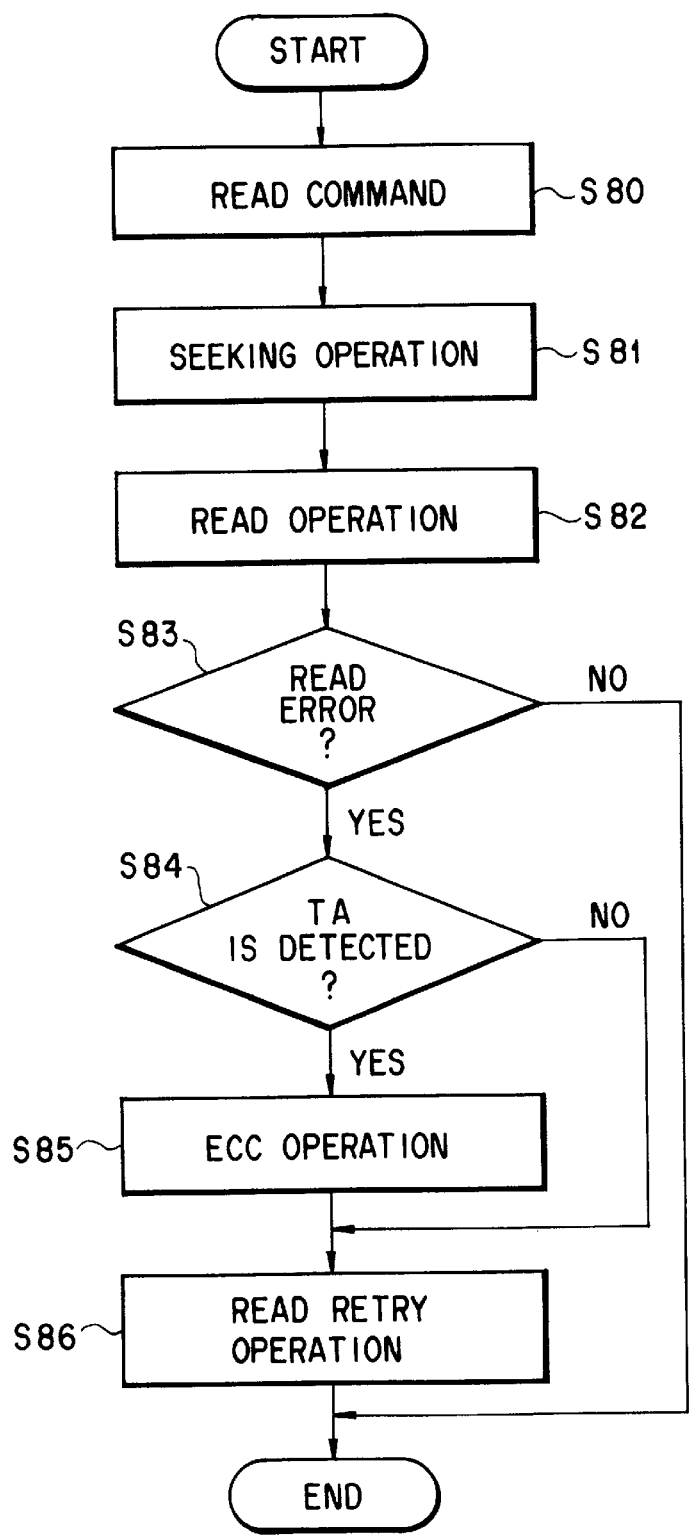
F I G. 9

READ ERROR RECOVERY METHOD AND APPARATUS FOR USE IN DISK STORAGE SYSTEM

BACKGROUND OF THE INVENTION

1. Field of the Invention

This invention relates to a disk storage system particularly used as a hard disk drive and employing a magnetoresistive (MR) head as a read head.

2. Description of the Related Art

A disk storage system, such as a hard disk drive (HDD), magnetically records data on a disk as a recording medium, and reproduces original record data from data read from the disk, using a magnetic head (hereinafter referred to simply as "head").

In the field of HDDs, a technique for using a magnetoresistive (MR) head as a read head for reading data from a disk has recently been developed to realize high record density. The HDD requires a read/write head for recording and reproducing data. In general, a head of a record/reproduction separated type, which consists of an MR head (as a read head) and an inductive head (as a write head) formed integral with the MR head as one body, is used as the read/write head. In this record/reproduction separated type head, the magnetic gap of the write head and that of the MR head can be optimized, and hence both record characteristics and reproduction resolution can be enhanced.

The MR head uses an element with a resistance, which is variable in accordance with a variation in magnetic flux corresponding to a variation in recording magnetic field on a disk. The data reproduction system of the HDD converts a variation in MR head resistance to a voltage signal corresponding to a read signal. In the HDD, a head slider on which the MR read head and the write head are mounted moves over the disk, with a fine flying height, for example, of about 50 nm kept above the disk. This being so, only a slight change in flying height may well cause collision of the MR head attached to the head slider, against a projection, etc. formed on the disk.

It is confirmed that the temperature of the MR head will abruptly increase when the head has collided against the surface of the disk, and the resistance of the head will accordingly change greatly. In accordance with an abrupt change in resistance of the MR head, the waveform of a read signal output from the MR head varies. This phenomenon is called "thermal asperity (TA)" phenomenon. FIG. 10A shows the characteristics of the TA phenomenon. In this figure, variations in resistance of the MR head appearing when the TA phenomenon occurs are indicated by variations in voltage level. FIG. 10B shows a normal read signal waveform corresponding to data undisturbed by the thermal asperity. FIG. 10C shows a read signal waveform obtained when the thermal asperity phenomenon occurs.

As regards the thermal asperity (TA) phenomenon, see the document "MAGNETIC RECORDING CHANNEL FRONT-ENDS by K. B. Klaassen" (IEEE TRANSACTIONS ON MAGNETS Vol. 27, No. 6, November 1991).

When the TA phenomenon has occurred, a read signal with an abnormal amplitude due to the TA, as shown in FIG. 10C, is input to the data reproduction section of the HDD. Since the amplitude of the read signal thus varies significantly, the data reproduction section cannot reproduce data until the amplitude of the read signal returns to a normal level. Moreover, an AGC circuit incorporated in the data reproduction section for keeping the level of the read signal constant will adversely be affected by the abnormal amplitude of the read signal. As a result, even if the output level of the MR head returns to its normal value, the output of the AGC circuit cannot be recovered for a certain period of time corresponding to the time constant of the abrupt change of the signal amplitude.

To solve the above problem, the aforementioned document, etc. proposes a method for detecting a change in DC level of the read signal output from the MR head, and adding a signal waveform of an opposite phase to the level-changing read signal to compensate the same. When the TA phenomenon occurs at the MR head, the amplitude of the read signal varies along an envelope as shown in FIG. 10C, because of abrupt increase in temperature and heat radiation. A DC level detection circuit for detecting the envelope of the signal waveform can be used as a TA detection circuit. Such a TA detection circuit is generally employed in a head amplifier circuit in the data reproduction system of the HDD.

As described above, in the HDD using the MR head, it is highly possible that the thermal asperity (TA) phenomenon will occur when the MR head collides against a projection (part of the disk surface itself or a fine particle attached thereto). The TA phenomenon will cause an abnormal change in waveform of the read signal output from the MR head, with the result that it is highly possible that a read error will occur during data reproduction. The aforementioned method is proposed to avoid this. The method, however, requires the DC level detection circuit (i.e. TA detection circuit) and a DC cancel circuit for performing addition of an opposite-phase signal. Furthermore, when in this method, the DC level of the read signal has abruptly changed and approached a signal component band, sufficient DC cancel cannot be performed.

SUMMARY OF THE INVENTION

It is the object of the invention to detect occurrence of thermal asperity (TA) phenomenon at the MR head and remove the cause thereof, thereby effectively removing a read error due to the TA phenomenon and realizing highly reliable data reproduction.

The invention is applicable to a disk storage system, and comprises means for performing a read retry operation when a read error is found in data read from the disk by an MR head incorporated therein, and determination means for determining that the read error is caused by the thermal asperity phenomenon of the MR head. This determination means presumes that the cause is the thermal asperity phenomenon, if the read error is not removed even after the read retry operation is repeated a predetermined number of times. The invention further comprises recovery means for performing an operation for removing the cause of the thermal asperity phenomenon. Specifically, the recovery means moves the MR head to a contact start stop (CSS) zone on the disk, thereby once stopping a motor which rotates the disk, and again starting the rotation of the motor. As a result, a fine particle (such as dust) attached to the MR head, which may well cause frictional heat and hence the thermal asperity phenomenon, is removed therefrom.

The invention presumes occurrence of the thermal asperity phenomenon of the MR head without using a dedicated TA detection circuit. Further, the invention can remove the cause of the TA phenomenon without using a DC cancel circuit.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2 and 3 are flowcharts, useful in explaining the operation of a first embodiment of the invention;

FIG. 9 is a flowchart, useful in explaining the operation of a fifth embodiment of the invention.

DETAILED DESCRIPTION OF THE PREFERRED EMBODIMENTS

First through fifth embodiments of the invention will be described with reference to the accompanying drawings.
(Structure of HDD)

Figure 1:
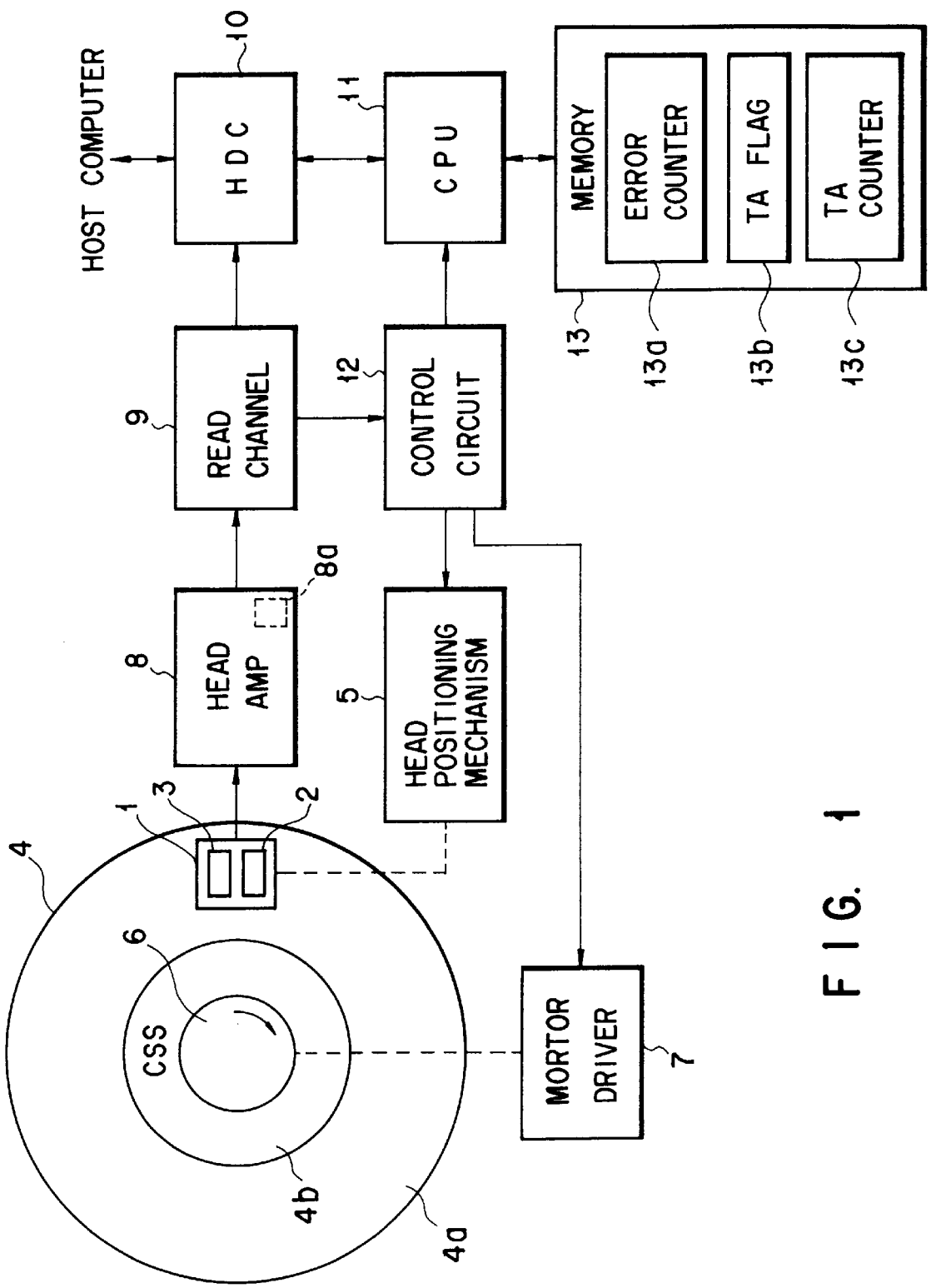
FIG. 1 is a block diagram, showing an essential part of a hard disk drive relating to the invention.

FIG. 1 shows an essential structure commonly employed in HDDs according to first through fifth embodiments of the invention. This structure includes a head 1 of a record/reproduction separated type, which consists of an MR head 2 used as a read head, and an inductive head 3 formed integral with the MR head 2 and used as a write head. The head 1 has a head slider which flies over a disk 4 at the time of reading or writing data from or into the disk. The heads 2 and 3 which constitute the head 1 are mounted on the head slider.

The head 1 is moved by a head positioning mechanism 5 in a radial direction of the disk as a recording medium, and situated in a target position (on a track to be accessed). A single disk or a plurality of disks are attached to a spindle motor 6, and rotated at a predetermined high speed. The spindle motor 6 is driven by a motor driver 7. To facilitate the explanation below, suppose that the HDD has two heads 1, and a single disk 4 is used. One of the heads 1 is opposed to one surface of the disk 4 and the other is opposed to the other surface.

The disk 4 has a data zone 4a for recording data therein, and a contact start stop (CSS) zone 4b located inside. The CSS zone 4b is a non-data zone, where the head 1 is retreated in contact therewith while the HDD does not operate.

The head positioning mechanism 5 is a servo mechanism which mainly comprises an actuator for supporting and moving the had 1, and a voice coil motor for driving the actuator. The head positioning mechanism 5 is controlled by a CPU 11 as the main control unit of the HDD, so as to move the head 1 to a target position on the disk 4.

The data reproduction system of the HDD comprises a head amplifier circuit 8, a read channel 9, and a disk controller (HDC) 10. The head amplifier circuit 8 amplifies a read signal output from the MR head 2 and outputs it to the read channel 9. Suppose that the head amplifier 8 includes a TA detection circuit 8a which will be described in detail in fourth and fifth embodiments. As aforementioned, the TA detection circuit 8a is formed of a DC level detection circuit for detecting the envelope of the conventional signal waveform.

The read channel 9 is a signal processing circuit for reproducing (restoring) data from a read signal output by the MR head 2. For example, the read channel 9 is a signal processing circuit which employs a Partial Response Maximum Likelihood (PRML) system. The read channel 9 transfers reproduced data (e.g. encoded data of the NRZ system) to a disk controller (HDC) 10.

The HDC 10 has a function for interfacing the HDD with a host computer and a function for controlling data. Specifically, the HDC 10 performs various types of control, such as transfer control of record/reproduction data, command processing (including change of address), error check processing of read data, etc.

The CPU 11 is a main control unit in the HDD, and executes a read retry operation and a thermal asperity (TA) removing operation. Further, the CPU 11 usually performs drive control of a motor driver 7 or the voice coil motor of the head positioning mechanism 5 via a control circuit (an interface control circuit consisting of a gate array for outputting control signals) 12. The control circuit 12 has a function for receiving, from the read channel 9, servo information necessary for the drive control of the head positioning mechanism 5, and outputting the information to the CPU 11.

A memory 13 is a random access memory (RAM) controlled by the CPU 11, and includes an error counter 13a, a TA flag register 13b and a TA counter 13c.
(First Embodiment)

An HDD according to a first embodiment of the invention performs a usual read retry operation when a read error occurs, and assumes that the read error is caused by the thermal asperity phenomenon of the MR head 2 if the read error is not removed even after the read retry operation. Then, the HDD performs an operation for removing the TA phenomenon.

The first embodiment will be described with reference to the flowcharts shown in FIGS. 2 and 3.

When the HDC 10 receives a read command from a host computer, the HDD starts the read operation to read designated data from the disk 4 (step S1). At the start of the read operation, the CPU 11 sets the error counter 13a of the memory 13, and resets the TA flag register 13b (step S2). The CPU 11 further sets a maximum value Emax as an error count value Ec (step S3). The maximum value Emax indicates the maximum number of occasions wherein the read retry operation or the TA removing operation is repeated. In other words, the read error count value Ec corresponds to the number of occasions of read retry. If the count value Ec exceeds the maximum value Emax, it is determined that removal of a read error is impossible, and the read error recovery operation is stopped.

In accordance with the read command, the CPU 11 controls the head positioning mechanism 5 so as to move the MR head 2 to a target position on the disk 4 (step S4). Specifically, the head (i.e. the slider) 1 is moved such that the MR head 2 is situated in the target position on the disk 4 wherein data to be accessed is recorded (i.e. on a target track including a sector to be accessed).

The MR head 2 executes a read operation to read data from the target position on the disk 4 (step S5). A read signal output from the MR head 2 is amplified by the head amplifier circuit 8 and input to the reach channel 9, where signal processing is performed to reproduce the data. Suppose that in this embodiment, the TA detection circuit 8a of the head amplifier circuit 8 is not functioning. The read channel 9 reproduces record data from the read signal and outputs the reproduced data to the HDC 10.

The HDC 10 performs error check processing to check the reproduced data, and then transfers the checked data to the host computer if it is determined that the data is normal (i.e. if the answer to the question in a step S6 is No). If, on the other hand, it is determined that a read error occurs (i.e. if the answer to the question in the step S6 is Yes), the HDC 10 notifies it to the CPU 11. The CPU 11 in turn performs predetermined read retry processing.

In a normal state, the CPU 11 changes various read parameters (such as a filter (LPF) parameter, etc.) necessary for the signal processing by the read channel 9 (step S7). Then, the CPU 11 controls the MR head 2 to retry to read data from the target position on the disk (step S8). At this time, the CPU 11 increments the count value of the error counter 13a. Thus, each time a read error occurs and the read retry processing is performed, the count value of the error counter 13a is incremented.

If the read error is not removed even after the first-time read retry processing is performed (i.e. if the answer to the question in a step S9 is Yes), the CPU 11 performs the next read retry processing on a continuous basis. In a step S10, the CPU 11 executes seek offset processing, i.e. processing for correcting the position of the MR head 2. In a step S11, the CPU 11 controls the MR head 2 to retry to read data from the target position. If at this time, no read error occurs (i.e. if the answer to the question in a step S12 is No), the read retry processing is finished, and the HDC 10 is shifted to processing for transferring data to the host computer.

If in this embodiment, the read error is not removed even after the CPU 11 performs second-time read retry processing, it determines that the read error is caused by the thermal asperity (TA) phenomenon which occurs at the MR head 2 (steps S13, S14).

The inventors of this invention consider that the TA phenomenon may well occur in a case (1) where a fine particle (dust, etc.) is attached to the MR head 2, in a case (2) where the MR head 2 contacts a projection on the disk 4 since the flying height of the head 2 has changed, in a case (3) where the MR head 2 collides with a projection grown on the disk 4, and in a case (4) where a fine particle (dust, etc.) attached to the MR head 2 makes its flying height unstable, resulting in collision thereof with a projection on the disk 4.

(Operation for Removing TA)

The CPU 11 is shifted to processing for removing the TA phenomenon, which is illustrated in the flowchart of FIG. 3. First, the CPU 11 checks the error count value Ec of the error counter 13a, and compares the error count value Ec (i.e. the number of occasions of read retry processing) with the predetermined maximum value Emax (steps S20, S21). If the read error count value Ec exceeds the maximum value Emax (i.e. if the answer to the question in the step S21 is No), it is determined that read error recovery is impossible, thereby stopping the TA removing processing and the read retry processing.

If the error count value Ec is lower than or equal to the maximum value Emax (i.e. if the answer to the question in the step S21 is Yes), the CPU 11 controls the head 1 (the MR head 2) to move to the CSS zone 4b on the disk 4 (step S22), thereby controlling the driver 7 so as to stop the spindle motor 6 (step S23). As a result, the rotation of the disk 4 stops, and the slider stops floating and contacts the surface of the disk 4. Accordingly, the MR head 2 contacts the surface of the disk 4.

The CPU 11 then controls the motor driver 7 to start the spindle motor 6 (step S24). Accordingly, the disk 4 again rotates, which makes the head 1, i.e. the slider, start to float. At this time, the MR head 2, which contacts the surface of the disk 4, slides thereon and then floats above the disk in accordance with the rotation of the disk 4. If a fine particle such as dust is attached to the MR head 2, it is highly possible that the particle is removed in the CSS zone 4b while the head slides therein. Therefore, the aforementioned cause (1) of the TA phenomenon can be eliminated by controlling the stop and start of the spindle motor 6 by the CPU 11.

After executing the TA removing processing, the CPU 11 sets a TA flag in the TA flag register 13b, thereby executing read retry processing (steps S25, S26). If no read error occurs during the read retry processing (i.e. if the answer to the question in a step S27 is No), the HDC 10 is shifted to processing for transferring data to the host computer. If, on the other hand, the read error occurs even after the TA flag, which indicates the elimination of the TA phenomenon, is set (i.e. if the answer to the question in a step S28 is Yes), the CPU 11 determines that read error recovery is impossible, and stops read retry processing.

(Operation for Removing TA according to Second Embodiment)

Figure 2:
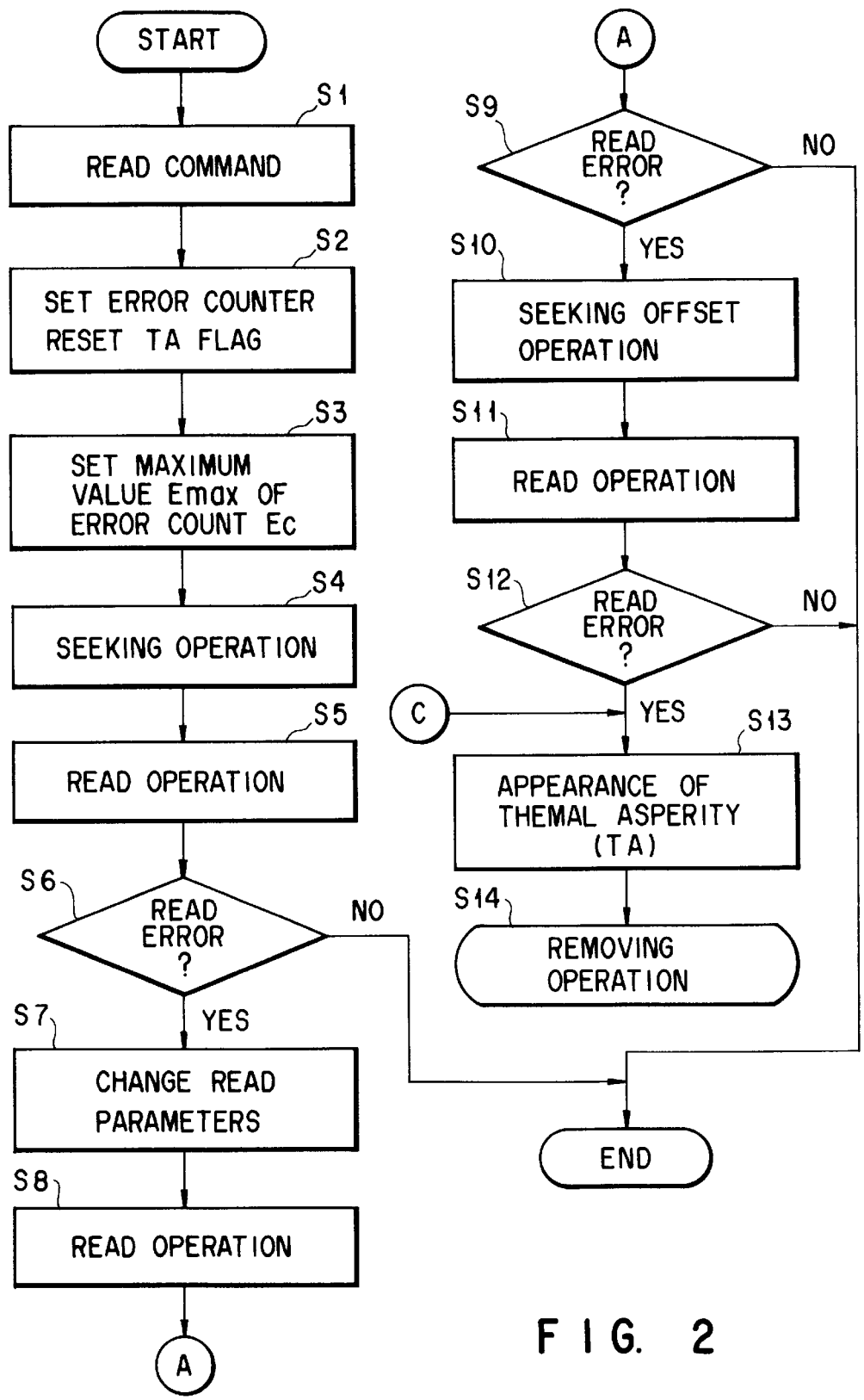
Figure 4:
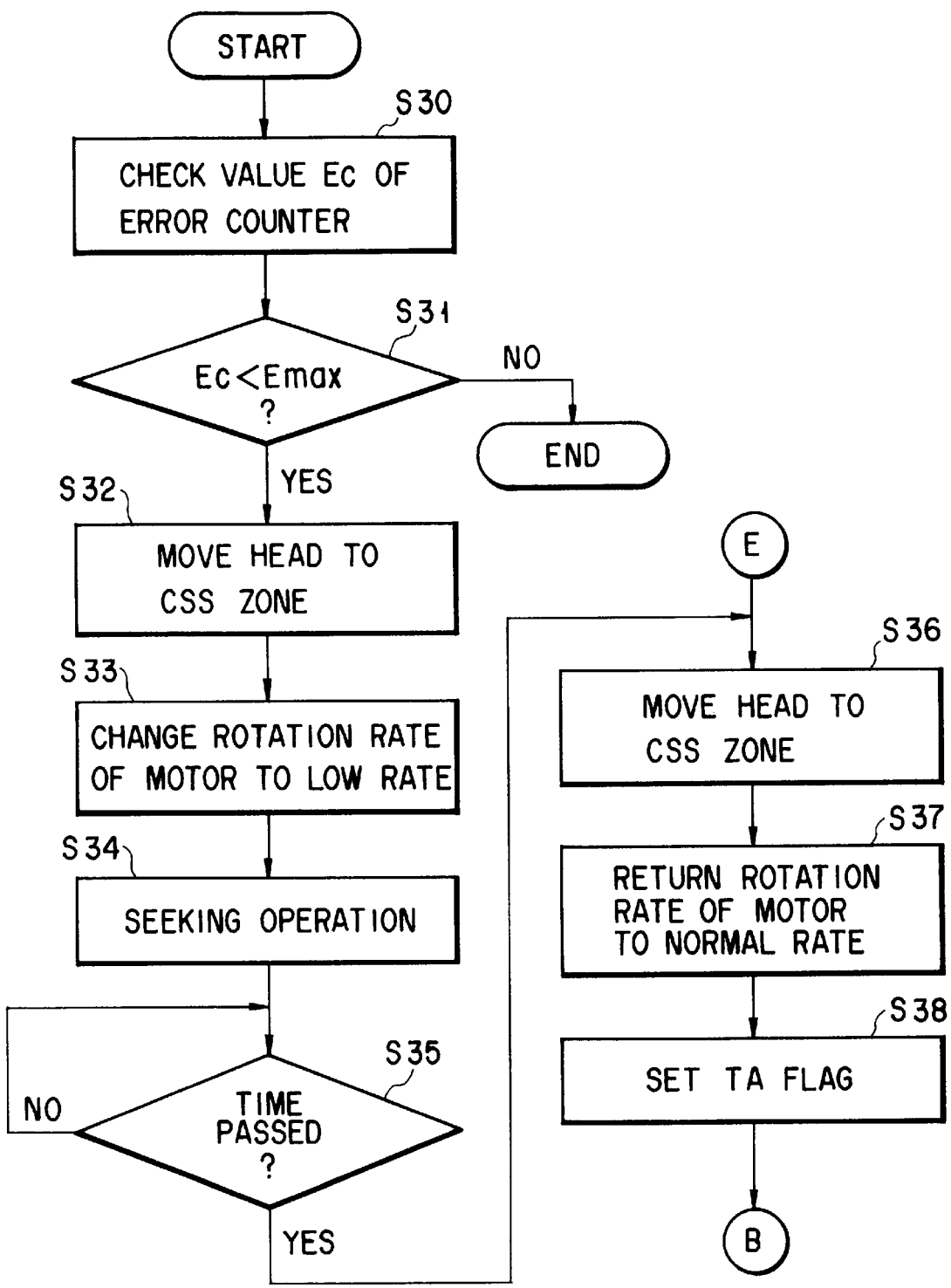
FIG. 4 is a flowchart, useful in explaining the operation of a second embodiment of the invention.

In a second embodiment of the invention, a TA removing operation as illustrated in the flowchart of FIG. 4 is executed, if the cause of the read error is presumed to be the TA phenomenon as a result of the read retry operation illustrated in the flowchart of FIG. 2.

First, the CPU 11 checks the error count value Ec of the error counter 13a, and compares the error count value Ec (i.e. the number of occasions of the read retry operation) with the predetermined maximum value Emax (steps S30, S31). If the read error count value Ec exceeds the maximum value Emax (i.e. if the answer to the question in the step S31 is No), it is determined that read error recovery is impossible, thereby stopping the TA removing operation and the read retry operation.

If the error count value Ec is lower than or equal to the maximum value Emax (i.e. if the answer to the question in the step S31 is Yes), the CPU 11 controls the head 1 (the MR head 2) to move to the CSS zone 4b on the disk 4 (step S32), thereby controlling the driver 7 so as to reduce the rotational speed of the spindle motor 6 (step S33). As a result, the flying height of the disk 4 reduces, and hence the fine space between the MR head 2 and the surface of the disk 4 further reduces.

The CPU 11 then controls the head 1 to move again to the target position on the disk 4 (at which the TA occurs), and controls the head 1 to wait there (steps S34, S35). After a predetermined period of time passes, the CPU 11 controls the head 1 to move to the CSS zone 4b of the disk 4, and controls the rotational speed of the spindle motor 6 to return to the normal value (steps S36, S37). Controlling the head 1 to wait above the target position (the TA phenomenon occurrence position) for the predetermined period time can remove a fine particle (such as dust) attached to the MR head 2 or a projection on the disk 4.

Specifically, since the rotational speed of the spindle motor 6 is low in the target position on the disk 4, the flying height of the slider reduces such that the MR head 2 is almost in contact with the disk 4. Therefore, if a fine particle such as dust is attached to the MR head 2, it is highly possible that the particle is brought into contact with the disk 4 and hence removed from the head. Similarly, if a projection is formed on the disk 4, it may well be brought into contact with the MR head 2 and hence removed from the disk 4.

Thus, the aforementioned causes (1)–(3) of the TA phenomenon can be eliminated. After executing the TA removing processing, the CPU 11 sets the TA flag in the TA flag register 13b, thereby executing read retry processing (steps S38, S26). If no read error occurs during the read retry processing (i.e. if the answer to the question in a step S27 is No), the HDC 10 is shifted to processing for transferring data to the host computer. If, on the other hand, the read error occurs even after the TA flag, which indicates the elimination of the TA phenomenon, is set (i.e. if the answer to the question in a step S28 is Yes), the CPU 11 determines that read error recovery is impossible, and stops read retry processing.

To reduce the rotational speed of the spindle motor 6 or increase the same to the normal value, it is not always necessary to move the head 1 (the MR head 2) to the CSS zone 4b of the disk 4. However, since the operation of moving the head 1 to the CSS zone 4b does not require positioning control (servo operation), the rotational speed of the spindle motor 6 can be changed smoothly.

(Operation for Removing TA according to Third Embodiment)

Figure 5:
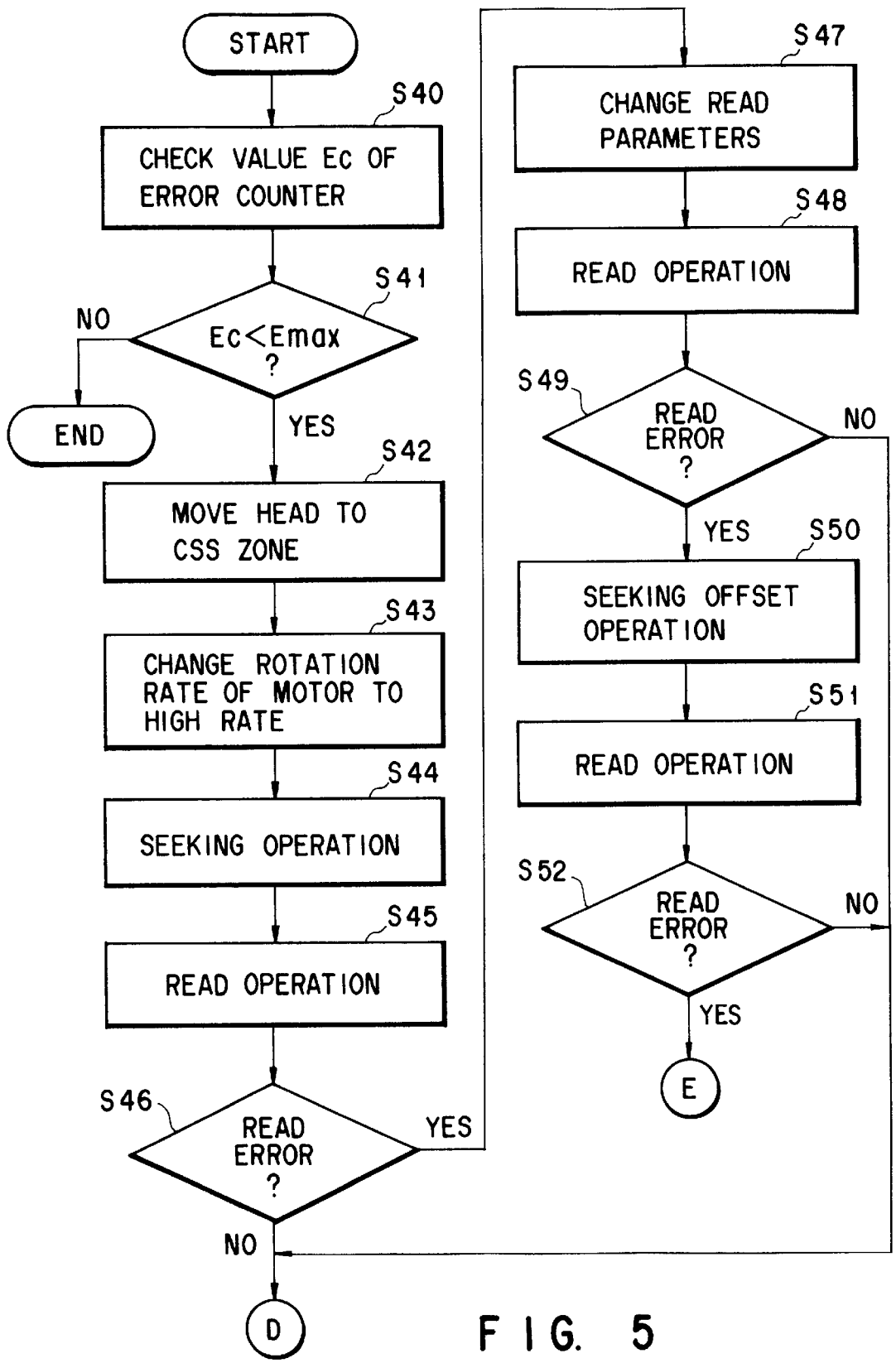
FIGS. 5 and 6 are flowcharts, useful in explaining the operation of a third embodiment of the invention.

In a third embodiment of the invention, a TA removing operation as illustrated in the flowchart of FIG. 5 is executed, if the cause of the read error is presumed to be the TA phenomenon as a result of the read retry operation illustrated in the flowchart of FIG. 2.

First, the CPU 11 checks the error count value Ec of the error counter 13a, and compares the error count value Ec (i.e. the number of occasions of the read retry operation) with the predetermined maximum value Emax (steps S40, S41). If the read error count value Ec exceeds the maximum value Emax (i.e. if the answer to the question in the step S41 is No), it is determined that read error recovery is impossible, thereby stopping the TA removing operation and the read retry operation.

If the error count value Ec is lower than or equal to the maximum value Emax (i.e. if the answer to the question in the step S41 is Yes), the CPU 11 controls the head 1 (the MR head 2) to move to the CSS zone 4b of the disk 4 (step S42), thereby controlling the driver 7 so as to increase the rotational speed of the spindle motor 6 (step S43). As a result, the flying height of the disk 4 increases, and hence the fine space between the MR head 2 and the surface of the disk 4 increases.

The CPU 11 then controls the head 1 to move again to the target position on the disk 4 (at which the TA occurs), thereby executing usual read retry processing as in the FIG. 2 case (steps S45–S52). At this time, if the read error is removed by the usual retry processing, the program proceeds to the processing illustrated by the flowchart of FIG. 6. In other words, the CPU 11 controls the head 1 (the MR head 2) to move to the CSS zone 4b of the disk 4, thereby returning the rotational speed of the spindle motor 6 to the normal value (steps S53, S54). Thereafter, the CPU 11 sets the TA flag in the TA flag register 13b, followed by the termination of the processing (step S55).

On the other hand, if the read error is not removed even after the usual read retry processing, the CPU 11 is shifted to processing in the step S36, et seq. of FIG. 4. Specifically, the CPU 11 controls the head 1 (the MR head 2) to move to the CSS zone 4b of the disk 4, and controls the rotational speed of the spindle motor 6 to return to the normal value (steps S36, S37). Thereafter, the CPU 11 sets the TA flag in the TA flag register 13b (step S38), and performs the processing illustrated in FIG. 3 (steps S26–S28). In other words, if no error occurs after the read retry processing is performed (i.e. if the answer to the question in the step S27 is No), the HDC 10 is shifted to processing for transferring data to the host computer. If, on the other hand, the read error still exists even after the TA flag, which indicates the elimination of the TA phenomenon, is set (i.e. if the answer to the question in a step S28 is Yes), the CPU 11 determines that read error recovery is impossible, and stops read retry processing.

In the third embodiment, the flying height of the MR head 2 is temporarily increased by increasing the rotational speed of the spindle motor 6. Thus, if the TA phenomenon is caused by the collision of the MR head 2 against a projection on the disk 4, the rate of occurrence of the TA phenomenon can be reduced by increasing the flying height. In light of this, whether or not the read error is removed is determined by executing the read retry operation with the flying height of the head temporarily increased.

If in the third embodiment, the rotational speed of the spindle motor 6 is returned to its normal value, the read error due to the TA phenomenon still exists, since the projection on the disk which is the cause of the TA phenomenon is not removed. However, the CPU 11 can monitor the position on the disk in which the TA phenomenon occurs, by referring to the TA flag set in the TA flag register 13b. In this case, the TA flag register 13b stores the TA flag and a sector address assigned to the TA occurrence position.

(Operation for Removing TA according to Fourth Embodiment)

Figure 8:
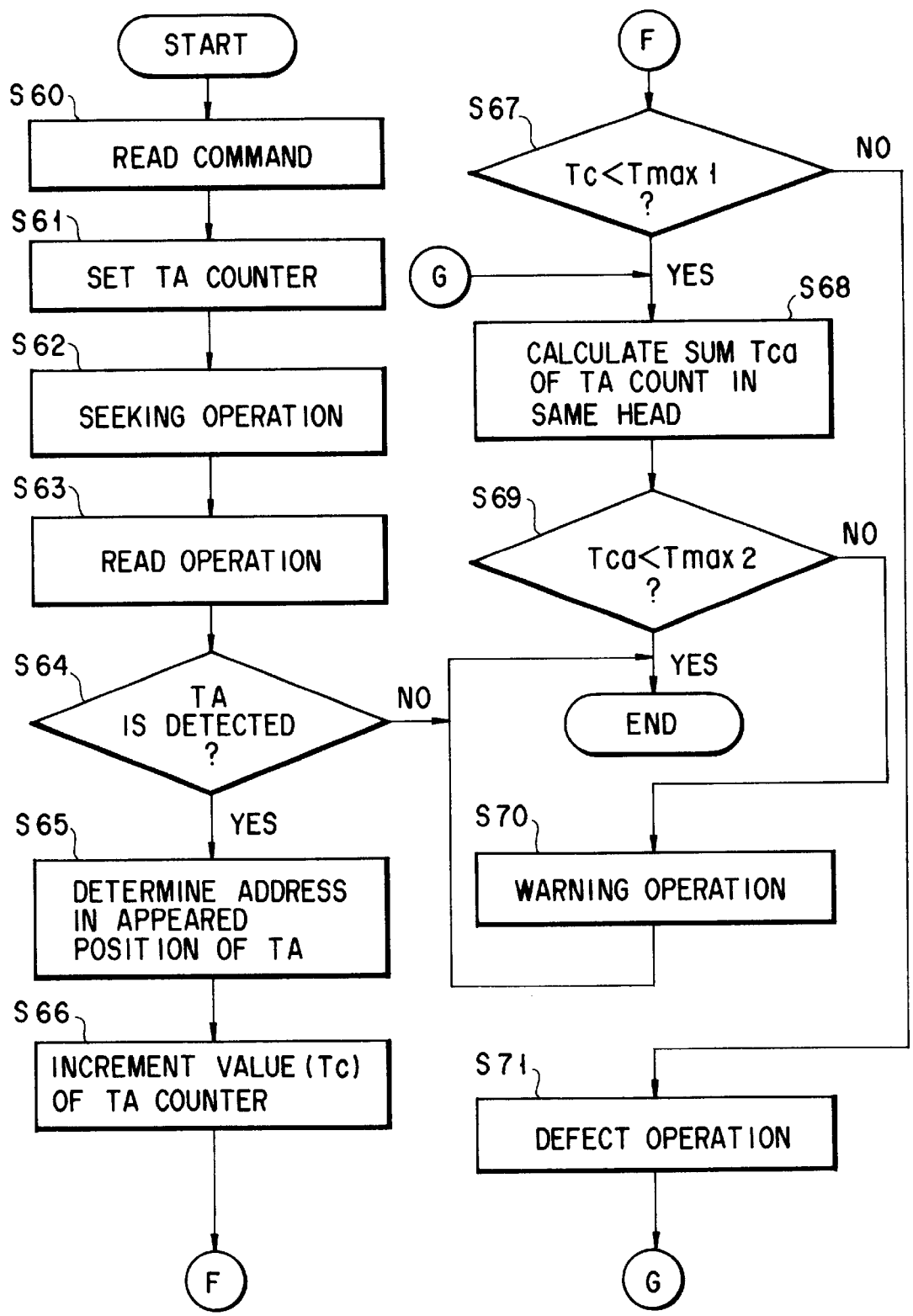
FIG. 8 is a flowchart, useful in explaining the operation of a fourth embodiment of the invention.

In a fourth embodiment of the invention, if the cause of the read error is presumed to be the TA phenomenon as a result of the read retry operation illustrated in the flowchart of FIG. 2, the CPU 11 monitors the TA occurrence position, and performs predetermined defect processing or processing for warning the occurrence to the host computer. This embodiment will be described in detail with reference to FIGS. 7 and 8.

First, when the HDC 10 has received a read command from the host computer, it starts a read operation for reading designated data from the disk 4 (step S60). At the start of the read operation, the CPU 11 initializes the TA counter 13c of the memory 13 (step S61). The TA counter 13c is used to monitor the TA phenomenon.

In accordance with the read command, the CPU 11 controls the head positioning mechanism 5 to move the MR head to a target position on the disk 4 (step S62). Specifically, the head 1 is moved such that the MR head 2 is situated in a target position on the disk 4 (a target track including a sector to be accessed). The MR head 2 executes a read operation for reading data from the target position on the disk 4 (step S63).

Figure 10A:
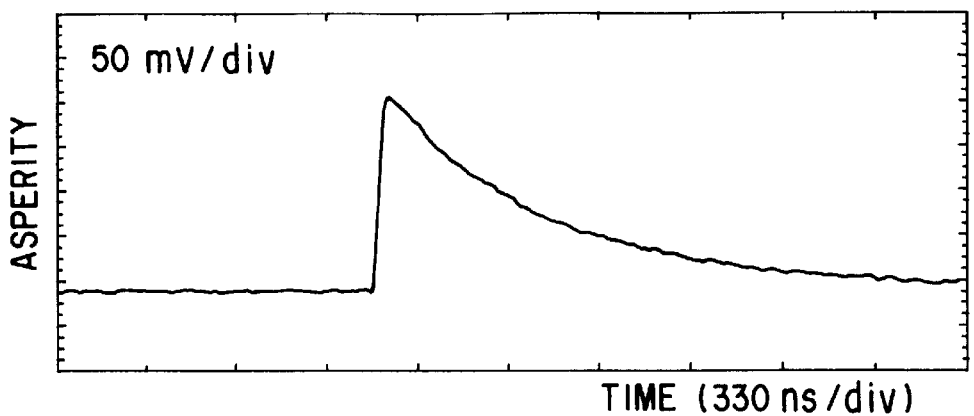
FIGS. 10A, 10B and 10C are views, useful in explaining thermal asperity phenomenon occurring in the conventional MR head.
Figure 10B:
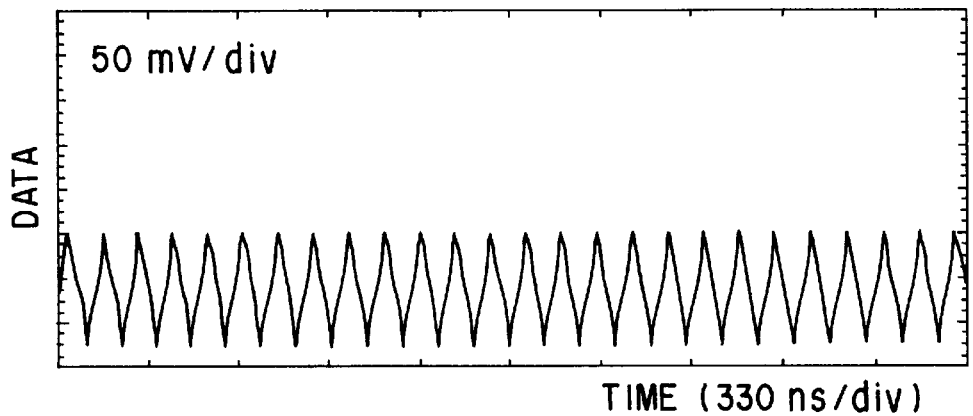
Figure 10C:
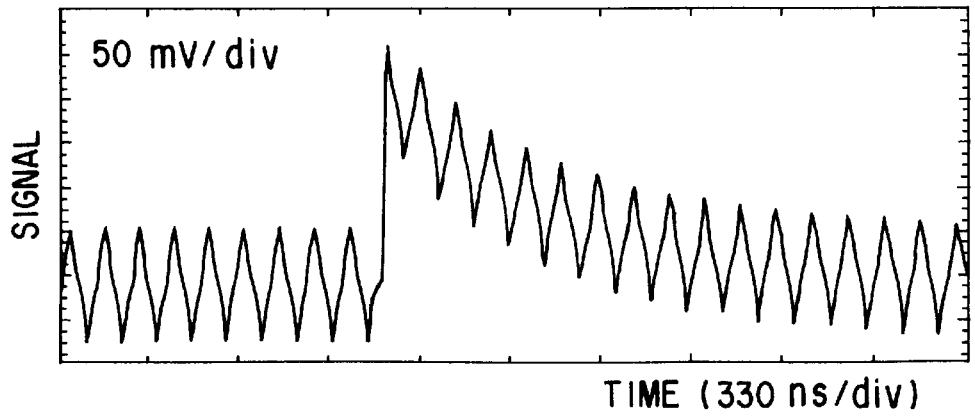

If the CPU 11 detects occurrence of the TA phenomenon at the MR head 2 during the read operation (i.e. if the answer to the question in a step S64 is Yes), it obtains an address corresponding to the position in which the TA phenomenon occurs, i.e. a track address and a sector address corresponding to the position on the disk 4 at which the MR head 2 has tried to read data (step S65). As is described above, the TA occurrence can be detected by the presumption method based on the read retry operation. The TA occurrence, however, can be also detected by a method using a TA detection circuit 8a incorporated in the heat amplifier circuit 8 and shown in FIG. 1. The TA detection circuit 8a consists of a DC level detection circuit for detecting the envelope of the read signal wave (see FIG. 10C) output from the MR head 2, and detects a signal component whose level exceeds a predetermined reference value.

When the CPU 11 has detected, on the basis of a detection signal from the TA detection circuit 8a, such abnormal level fluctuation in read signal waveform from the MR head 2 as indicated by the envelope, it presumes that the TA phenomenon occurs at the MR head 2.

Figures 6, 7:
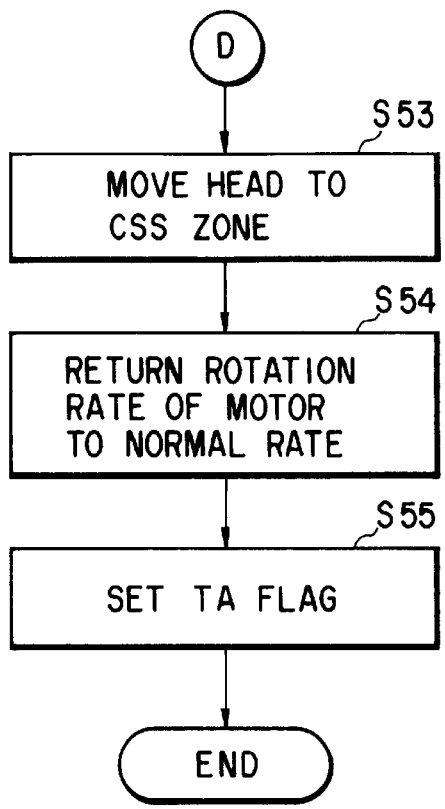
FIG. 7 is a view, showing a table relating to a fourth embodiment of the invention.

The CPU 11 stores address information (position information) indicative of the TA occurrence position, and counts the number of occasions, in which the TA occurs, by incrementing the count value of the TA counter 13c (step S66). At this time, the CPU 11 creates a table as shown in FIG. 7 for monitoring positions in which the TA occurs. The table shows a sector address, a head number, and a TA occurrence count value (Tc), which indicate each TA occurrence position.

If the TA occurrence count value Tc exceeds a predetermined reference value (Tmax1) (i.e. if the answer to the question in a step S67 is No), the CPU 11 controls the HDC 10 so as to perform a defect operation (step S71). The predetermined reference value (Tmax1) enables the CPU 11 to presume that there is a projection on the disk 4 which will cause the TA phenomenon. The HDC 10 sets a flag to indicate, as a defect sector, the sector indicative of the TA occurrence position, and executes the detect operation for setting a substitutional section (step S71).

On the other hand, if the answer to the question in the step S67 is Yes, the CPU 11 calculates the sum (Tca) of TA occurrence count values in the same head number (step S68). For example, referring to FIG. 7, the sum (Na+Nb) of a TA count value (Na) corresponding to a sector address (X) and a TA count value (Nb) corresponding to a sector address (Y) is calculated as regards an MR head 2 with head number 0. Then, the CPU 11 compares the calculated sum (Tca) with a predetermined reference value (Tmax2). If the sum (Tca) exceeds the reference value (Tmax2) (i.e. if the answer to the question in a step S69 is No), the CPU 11 executes a warning operation to warn the host computer (step S70). From the reference value (Tmax2), the CPU 11 presumes that recording/reproducing of data into/from that data surface of the disk 4 which corresponds to the MR head 2 with head number 0 is actually impossible.

As described above, in the fourth embodiment of the invention, the TA occurrence position is monitored, and the defect and/or warning operation are executed in the HDD, if the cause of the TA occurrence cannot be removed by the methods employed in the first through third embodiments, and accordingly the TA occurrence is detected several times. In other words, where the occurrence of the TA phenomenon is not temporary and may adversely affect the data recording/reproducing operation of the HDD, such a state is avoided and the reliability of the system is maintained.

(Operation for Removing TA according to Fifth Embodiment)

When in this embodiment, occurrence of the TA phenomenon is detected at the MR head 2 during read operation, error checking and correction (ECC) are performed with respect to data to read. This embodiment will be described with reference to the flowchart of FIG. 9.

First, in response to a read command from the HDC 10, the CPU 11 controls the MR head 2 to move to a target position on the disk 4 (steps S80, S81). The MR head 2 executes the read operation to read data recorded in the target position (step S82). A read signal output from the MR head 2 is reproduced into read data by the read channel 9, and transmitted to the HDC 10.

If the HDC 10 detects read error in the read data (i.e. if the answer to the question in a step S83 is Yes), it notifies the CPU 11 of the error. At this time, the CPU 11 presumes, by the presumption method based on the read retry operation or using the TA detection circuit 8a, that the read error is caused by the occurrence of the TA phenomenon at the MR head 2 (the answer to the question in a step S84 is Yes).

The CPU 11 then notifies the HDC 10 of the ECC operation, thereby designating the TA occurrence position as the error occurrence position (step S85). In the ECC operation, in general, data in a sector in which the read error occurs is corrected using an ECC code assigned in units of a sector, and corrected data is transmitted to the host computer. Further, in the ECC operation, the error correction ability can be increased by determining where in the data string the error occurs. Thus, notifying the HDC 10 of the TA occurrence position as the error occurrence position enables the same to perform an effective ECC operation to data in a sector in which the read error occurs.

After the HDC 10 executes the ECC operation, the CPU 11 executes the normal read retry operation (step S86). After the read retry operation, the HDC 10 returns the ECC operation wherein the TA occurrence position is used as the error occurrence position, to the usual ECC operation.

As described above in detail, in the invention, it is presumed during read operation that the thermal asperity (TA) phenomenon occurs at the MR head 2, and a presumed cause of the phenomenon is removed to thereby effectively eliminate the TA phenomenon. This means that a read error due to the TA phenomenon can be reliably removed without using the TA detection circuit or the compensating DC cancel circuit.

In addition, even if the TA phenomenon cannot be removed, it is monitored and the defect function and the ECC function are effectively executed. As a result, damage of the system caused by the TA phenomenon is minimized.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A read error recovery apparatus for use in a disk storage system having an MR head for reading data from a disk, comprising:

first means for detecting a read error contained in data read from the disk by the MR head;

second means for performing a read retry operation, in response to detection of the read error contained in the read data;

third means for determining that the read error is caused by the thermal asperity phenomenon of the MR head, if the read error is not removed even after the read retry operation is repeated a predetermined number of times;

recovery means for moving the MR head to a predetermined area of the disk and removing the cause of the thermal asperity phenomenon; and means for setting a TA flag indicative of the occurrence of the thermal asperity phenomenon after the third means determines that the cause of the read error is the thermal asperity phenomenon of the MR head, and the operation of the recovery means is finished; and means for checking whether or not the TA flag is set, when the read error of the read data is detected, and inhibiting the read retry operation if the TA flag is set.

* * * * *